(12) United States Patent
Dudar

(10) Patent No.: US 9,644,552 B2
(45) Date of Patent: May 9, 2017

(54) SYSTEM AND METHODS FOR REFUELING A VEHICLE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 14/313,646

(22) Filed: Jun. 24, 2014

(65) Prior Publication Data

US 2015/0369151 A1 Dec. 24, 2015

(51) Int. Cl.
*F02D 41/00* (2006.01)
*F02M 25/08* (2006.01)
*F17C 5/02* (2006.01)
*F16K 21/18* (2006.01)
*F02D 41/04* (2006.01)

(52) U.S. Cl.
CPC .......... *F02D 41/0032* (2013.01); *F16K 21/18* (2013.01); *F17C 5/02* (2013.01); *F02D 41/042* (2013.01); *F02M 25/0818* (2013.01); *F02M 25/0836* (2013.01); *F17C 2227/04* (2013.01)

(58) Field of Classification Search
CPC .............. F02D 41/0032; F02D 41/042; F02M 25/0818; F02M 25/0836; F16K 21/18; F17C 2227/04; F17C 5/02
USPC ................................. 141/4, 59, 94
See application file for complete search history.

(56) References Cited

U.S. PATENT DOCUMENTS

| 4,683,861 | A | 8/1987 | Breitkreuz et al. |
| 4,699,638 | A | 10/1987 | Harris |
| 5,584,278 | A | 12/1996 | Satoh et al. |
| 8,082,905 | B2 | 12/2011 | Mai et al. |
| 8,434,461 | B2* | 5/2013 | Kerns ................ F02M 25/08 123/520 |
| 8,560,167 | B2 | 10/2013 | Jentz et al. |
| 2005/0022588 | A1* | 2/2005 | Hayakawa ......... F02M 25/0809 73/114.41 |
| 2006/0287804 | A1* | 12/2006 | Takayanagi .......... F02M 25/089 701/112 |
| 2009/0191470 | A1 | 7/2009 | Shirasaki |

(Continued)

FOREIGN PATENT DOCUMENTS

WO 9624792 A1 8/1996

OTHER PUBLICATIONS

Aghili, Mohammad R. et al., "Systems and Methods for Fuel Tank Pressure Control," U.S. Appl. No. 14/620,541, filed Oct. 22, 2015, 39 pages.

(Continued)

*Primary Examiner* — Mark A Laurenzi
*Assistant Examiner* — Andrew Schmid
(74) *Attorney, Agent, or Firm* — James Dottavio; McCoy Russell LLP

(57) ABSTRACT

A method for a fuel system, comprising: during a first condition, fluidly coupling a fuel tank to a fuel vapor canister; and fluidly coupling the fuel vapor canister to atmosphere via a deactivated vacuum pump. By fluidly coupling the fuel vapor canister to atmosphere via a deactivated vacuum pump, the fuel tank may be depressurized slowly without requiring a multi-stage or multi-valve fuel tank isolation system. In this way, the cost and complexity of the fuel system is reduced.

8 Claims, 5 Drawing Sheets

(56) References Cited

U.S. PATENT DOCUMENTS

| | | |
|---|---|---|
| 2011/0240145 A1 | 10/2011 | Pifer |
| 2012/0152370 A1 | 6/2012 | Menke et al. |
| 2013/0112176 A1 | 5/2013 | Peters et al. |
| 2014/0026866 A1 | 1/2014 | Pifher et al. |
| 2014/0026992 A1 | 1/2014 | Pearce et al. |

OTHER PUBLICATIONS

Dudar, Aed M. et al., "Fuel Tank Depressurization Before Refueling a Plug-In Hybrid Vehicle," U.S. Appl. No. 13/906,187, filed May 30, 2013, 28 pages.

Pearce, Russell Randall et al., "Engine-Off Leak Detection Based on Pressure," U.S. Appl. No. 13/962,562, filed Aug. 8, 2013, 27 pages.

Peters, Mark W. et al., "Systems and Methods for a Two-Valve Non-Integrated Refueling Canister Only System," U.S. Appl. No. 14/024,416, filed Sep. 11, 2013, 32 pages.

Bolger, Bryan M. et al., "Systems and Methods for Refueling Canister System," U.S. Appl. No. 14/260,900, filed Apr. 24, 2014, 52 pages.

\* cited by examiner

SYSTEM AND METHODS FOR REFUELING A VEHICLE

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

In hybrid-electric vehicles, the fuel tank is typically sealed with a fuel tank isolation valve (FTIV). Prior to refueling, fuel vapors in the tank may be vented to the fuel vapor canister by opening the FTIV. When the fuel tank pressure reaches a safe level, access to the fuel filler neck may be granted, through unlocking a refueling door, for example.

However, opening the FTIV when a significant pressure exists within the fuel tank may result in the corking of other fuel tank valves such as a grade vent valve and/or a fill limit vent valve, rendering them unusable. Depressurizing the fuel tank in this fashion could also lead to an abundance of hydrocarbons entering the engine intake system, altering the air/fuel ratio, and potentially leading to engine stalling. Additionally, any delays or imprecision in control of an FTIV may increase release of hydrocarbons or degraded air-fuel ratio control during purging. Further a loud hissing noise may occur as the fuel tank is depressurized in a single stage. Dual stage FTIVs with multiple sized orifices, or the use of multiple valves in parallel have been described, but these configurations may add complexity to a system, and may increase the difficulty of diagnosing malfunctions within the system.

The inventors herein have recognized the above problems and have developed systems and methods to at least partially address them. In one example, a method for a fuel system, comprising: during a first condition, fluidly coupling a fuel tank to a fuel vapor canister; and fluidly coupling the fuel vapor canister to atmosphere via a deactivated vacuum pump. By fluidly coupling the fuel vapor canister to atmosphere via a deactivated vacuum pump, the fuel tank may be depressurized slowly without requiring a multi-stage fuel tank isolation valve. In this way, the cost and complexity of the fuel system is reduced.

In another example, a system for a hybrid-electric vehicle, comprising: a fuel tank isolation valve coupled in a conduit between a fuel tank and a fuel vapor canister; an evaporative leak check module coupled in a conduit between the fuel vapor canister and atmosphere, the evaporative leak check module comprising a vacuum pump and a changeover valve operable between a first and second conformation, the evaporative leak check module; and a controller configured with instructions stored in non-transitory memory that when executed cause the controller to: responsive to a refueling request and further responsive to a fuel tank pressure being greater than a first threshold: place the changeover valve in the second conformation without activating the vacuum pump; and open the fuel tank isolation valve. The system thus controls the rate of depressurization via the evaporative leak check module changeover valve. In this way, the fuel tank isolation valve may be opened completely during depressurization without risking the fuel limit vent valve aspirating shut.

In yet another example, a method for refueling a vehicle, comprising: responsive to a refueling request, and during a condition where a fuel tank pressure is greater than a first threshold, opening a fuel tank isolation valve coupled between a fuel tank and a fuel vapor canister; fluidly coupling the fuel vapor canister to atmosphere via a deactivated vacuum pump; and responsive to the fuel tank pressure decreasing below the first threshold, fluidly coupling the fuel vapor canister to atmosphere bypassing the deactivated vacuum pump. By changing the position of the vent pathway between the fuel vapor canister and atmosphere, the fuel tank may be depressurized in two-stages without requiring additional components, such as a multi-valve fuel tank depressurization system. In this way, fuel system diagnostics may be simplified, leading to more robust diagnostic tests.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example vehicle propulsion system.

FIG. 2 schematically shows an example vehicle system with a fuel system and an evaporative emissions system.

DETAILED DESCRIPTION

This detailed description relates to systems and methods for refueling a vehicle. In particular, the description relates to systems and methods for depressurizing a fuel tank with a single stage fuel tank isolation valve via controlled depressurization. A refueling event may take place in a hybrid vehicle, such as the hybrid vehicle schematically depicted in FIG. 1. The hybrid vehicle may comprise a fuel system and evaporative emissions system, as depicted in FIG. 2. The hybrid vehicle may further comprise an evaporative leak check module (ELCM), comprising a vacuum pump and changeover valve (COV) operable to various configurations, as shown in FIGS. 3A-3D. During the fuel tank depressurization, the ELCM may be positioned to restrict air flow, thereby controlling the rate of depressurization, as shown by the method depicted in FIG. 4. FIG. 5 shows an example timeline for a refueling event using the method of FIG. 4.

Figure 1:
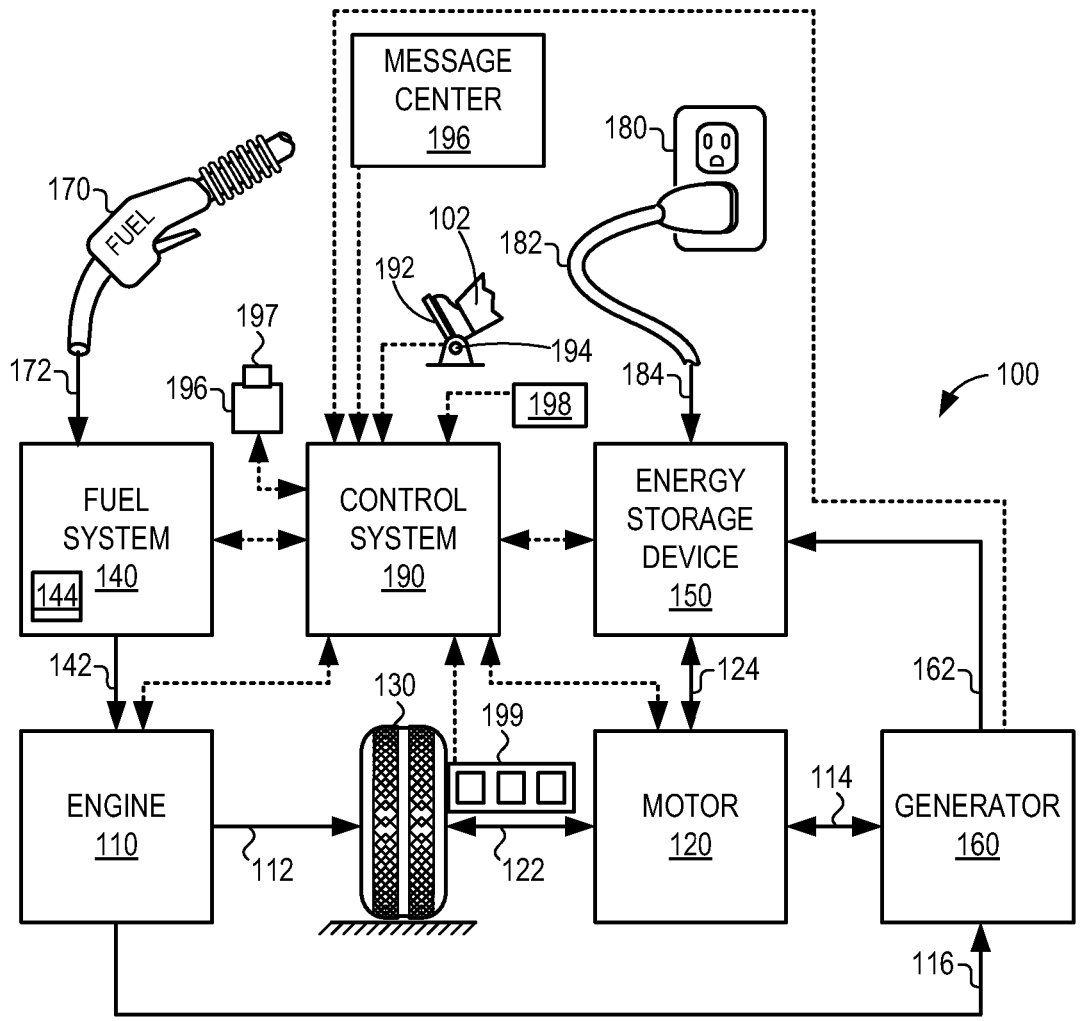
Figure 2:
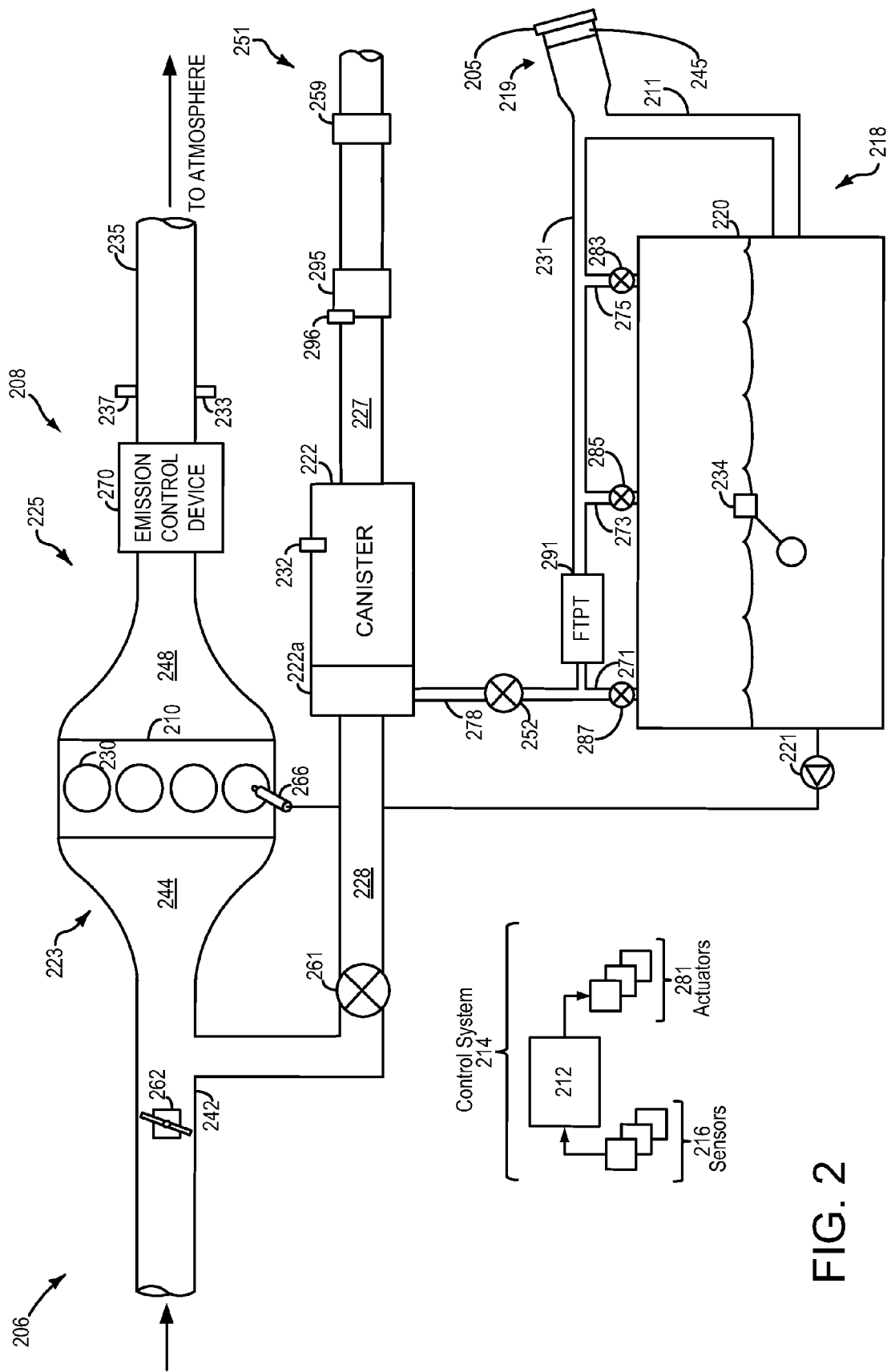

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 4.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

Figure 3A:
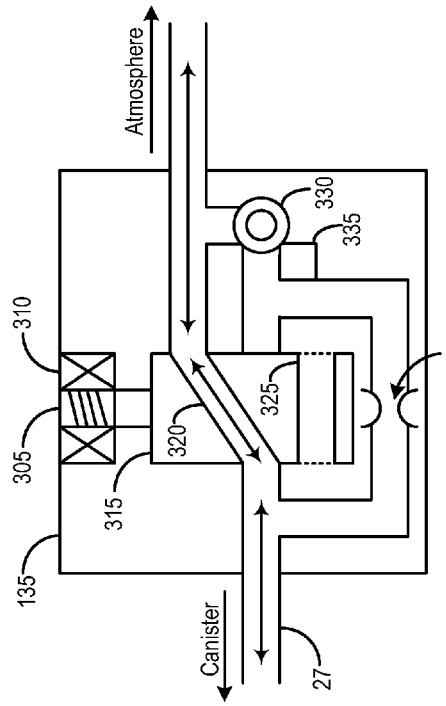
FIG. 3A shows a schematic depiction of an evaporative leak check module in a configuration to perform a reference check.
Figure 3B:
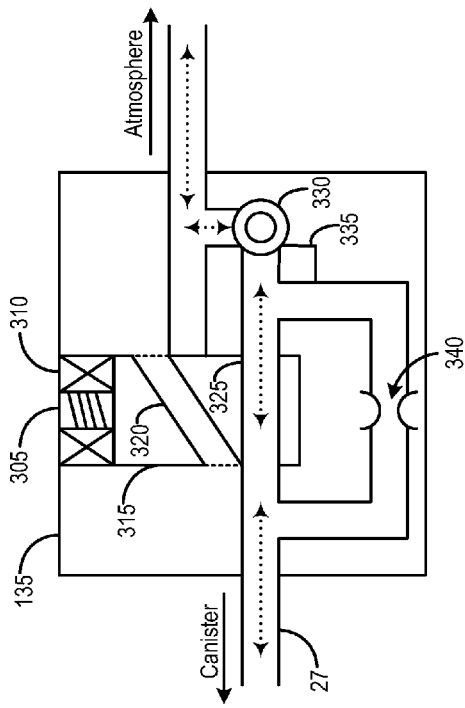
FIG. 3B shows a schematic depiction of an evaporative leak check module in a configuration to perform a fuel system evacuation leak check.
Figure 3C:
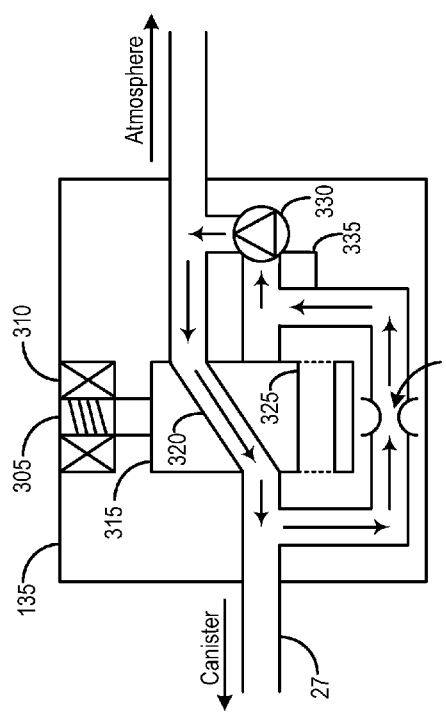
FIG. 3C shows a schematic depiction of an evaporative leak check module in a configuration to perform a purge operation.
Figure 3D:
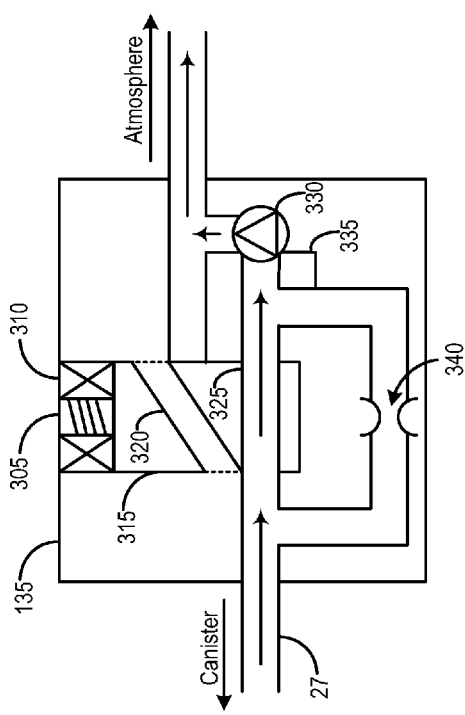
FIG. 3D shows a schematic depiction of an evaporative leak check module in a configuration to perform a fuel tank depressurization operation.

FIGS. 3A-3D show a schematic depiction of an example ELCM 295 in various conditions in accordance with the present disclosure. As shown in FIG. 2, ELCM 295 may be located along vent 227 between canister 222 and atmosphere. ELCM 295 includes a changeover valve (COV) 315, a pump 330, and a pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold leak to be tested, for example, 0.02". In either the first or second position, pressure sensor 296 may generate a pressure signal reflecting the pressure within ELCM 295. Operation of pump 330 and solenoid 310 may be controlled via signals received from controller 212.

As shown in FIG. 3A, COV 315 is in the first position, and pump 330 is activated in a first direction. Fuel tank isolation valve 252 (not shown) is closed, isolating ELCM 295 from the fuel tank. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for passing/failing a subsequent leak test.

As shown in FIG. 3B, COV 315 is in the second position, and pump 330 is activated in the first direction. This configuration allows pump 330 to draw a vacuum on fuel system 18. In examples where fuel system 18 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of a leak in the system should allow for the vacuum level in ELCM 295 to reach or exceed the previously determined vacuum threshold. In the presence of a leak larger than the reference orifice, the pump will not pull down to the reference check vacuum level.

As shown in FIG. 3C, COV 315 is in the first position, and pump 330 is deactivated. This configuration allows for air to freely flow between atmosphere and the canister. This configuration may be used during a canister purging operation, for example.

As shown in FIG. 3D, COV 315 is in the second position, and pump 330 is deactivated. This configuration allows for air to flow in a restricted manner between atmosphere and the canister. Air flow between atmosphere and the canister is directed through the deactivated pump. A pressure gradient may cause the vanes of the pump to rotate, leaking air down the gradient. As described further herein and with regards to FIGS. 4 and 5, in some embodiments, this configuration may be used during a controlled fuel tank depressurization.

During a refueling event, the fuel tank must first be depressurized prior to removing access restrictions to the fuel filler neck. This procedure ensures that fuel vapor in the fuel tank is directed to the fuel vapor canister, where it may be adsorbed, rather than being expelled to atmosphere. However, if the fuel tank comprises a relatively high pressure, depressurizing in a single stage may cause the FLVV to aspirate shut, and the fuel tank will thus not depressurize. In some scenarios, this may lead to fuel spitback through the fuel filler neck. In some examples, the PCM will continue to restrict access to the refueling lock, making it impossible to refuel the vehicle.

Figure 4:
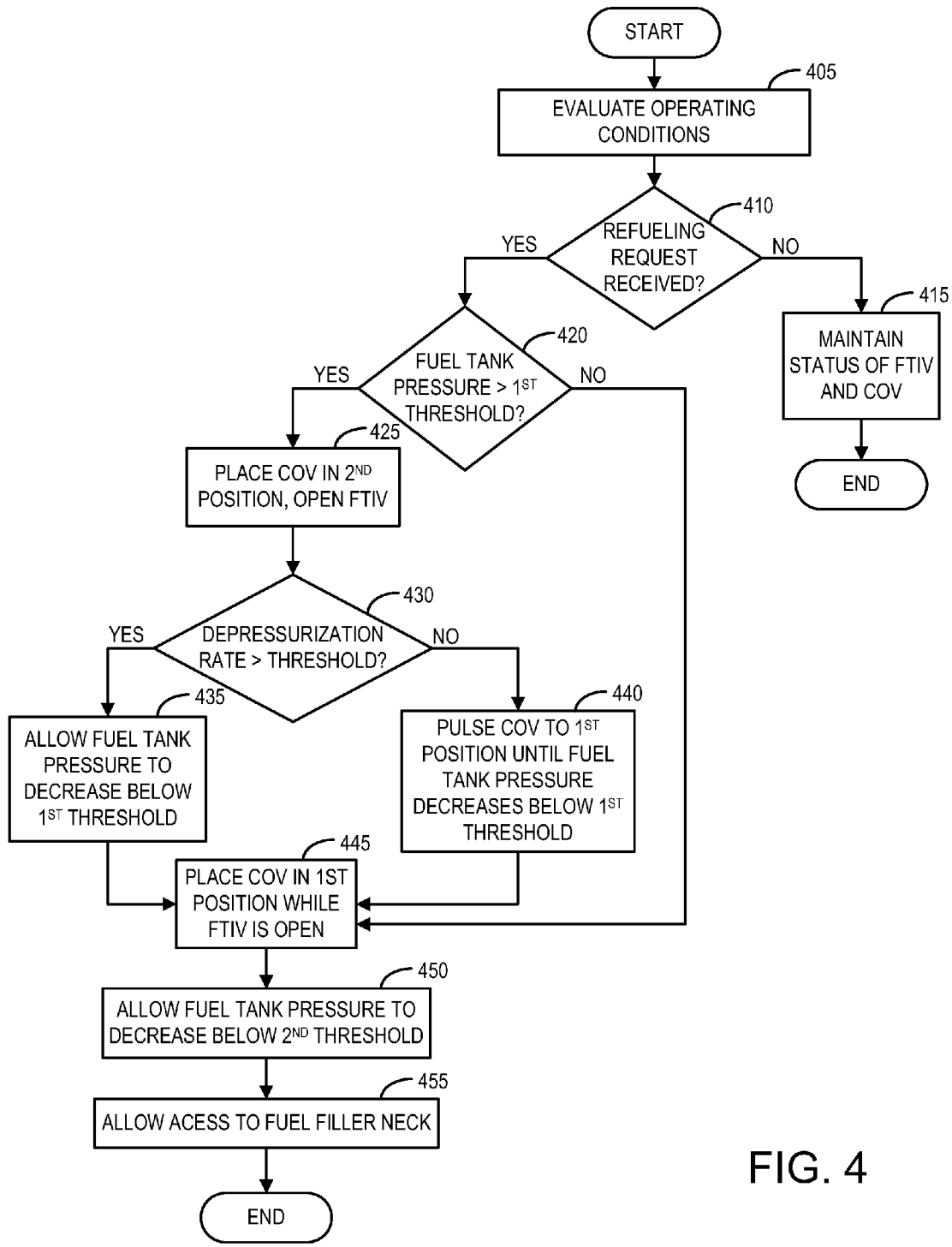
FIG. 4 shows a flow chart for an example high level method for a refueling event.
Figure 5:
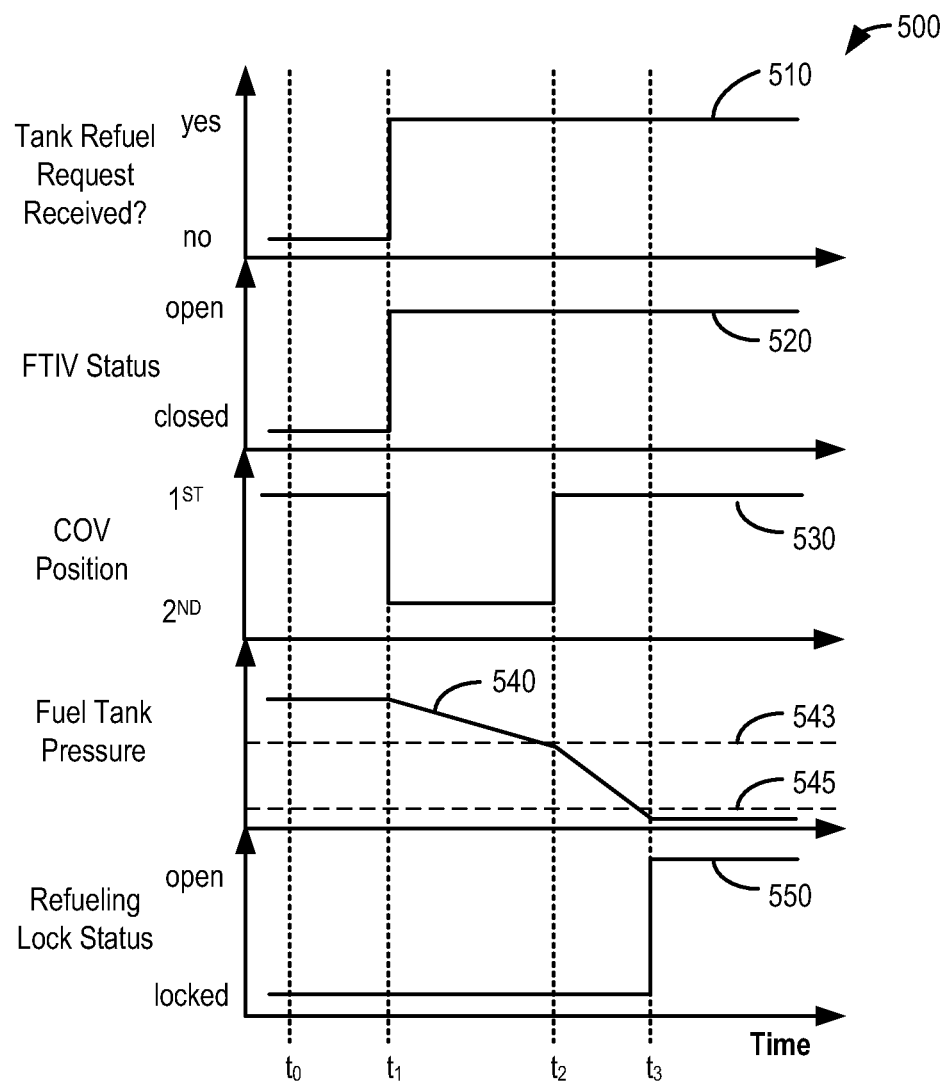
FIG. 5 shows a timeline for an example refueling event using the method of FIG. 4.

FIG. 4 shows a flow chart for a high-level method 400 for a refueling event in accordance with the present disclosure. Method 400 will be described with regard to the systems described herein and depicted in FIGS. 1, 2, and 3A-3D, but it should be understood that similar methods may be used with other systems without departing from the scope of this disclosure. Method 400 may be stored as instructions in non-transitory memory and executed by controller 212.

Method 400 may begin at 405 by evaluating engine operating conditions. Engine operating conditions may be measured, estimated or inferred, and may include various vehicle conditions, such as vehicle speed, various engine operating conditions, such as engine operating mode, engine speed, engine temperature, exhaust temperature, fuel tank fill level, fuel tank pressure, etc., as well as various ambient conditions, such as ambient temperature, humidity, barometric pressure, etc.

Continuing at 410, method 400 includes determining whether a refueling request has been received. For example, a refueling request may comprise a vehicle operator depression of a button, e.g., refueling button 197, on a vehicle instrument panel in the vehicle, e.g., instrument panel 196. In some examples, a refueling request may comprise a refueling operator requesting access to fuel filler neck 211, for example, by attempting to open a refueling door, and/or attempting to remove a gas cap. In some examples, a refueling request may comprise detecting the proximity of the vehicle to a refueling station, for example, via an on-board GPS, or via wireless communication between the vehicle and a refueling pump. A refueling request may include the operating conditions meeting other entry conditions for a refueling event, including, for example, an engine-off event, a fuel tank fill level less than a threshold, etc.

If a refueling request is not received, or entry conditions for a refueling event are not met, method 400 may proceed to 415. At 415, method 400 includes maintaining the status of the fuel system, including maintaining the position of FTIV 252 and COV 315. Method 400 may then end. If a refueling request is received and entry conditions for a refueling event are met, method 400 may proceed to 420.

At 420, method 400 includes determining whether a fuel tank pressure is greater than a first threshold. Fuel tank pressure may be determined through a pressure sensor coupled within the fuel tank, or may be inferred based on other available data. The first threshold may be representative of a fuel tank pressure above which rapid depressurization is likely to cause corking of FLVV 285. If the fuel tank pressure is not greater than the first threshold, method 400 may proceed to 445. If the fuel tank pressure is greater than the first threshold, method 400 may proceed to 425.

At 425, method 400 includes placing COV 315 in the $2^{nd}$ position, and further includes opening the fuel tank isolation valve. Opening the fuel tank isolation valve fluidly couples the fuel tank to the fuel vapor canister. The COV may be placed in the $2^{nd}$ position while maintaining ELCM pump 330 off. In this configuration, as shown in FIG. 3D, the fuel vapor canister is fluidly coupled to atmosphere via the deactivated ELCM pump. In this way, gasses stripped of fuel vapor exiting fuel vapor canister 222 may exit vent line 227 relatively slowly, allowing for depressurization of the fuel tank without causing an undue pressure change that may interfere with the function of other components of the fuel system of evaporative emissions system.

Continuing at 430, method 400 includes determining whether the fuel tank depressurization rate is greater than a threshold. Determining the fuel tank depressurization rate may include determining the fuel tank pressure over time. The depressurization rate threshold may be predetermined, or may be determined based on current operating conditions, such as fuel tank pressure and fuel tank fill level. The depressurization rate threshold may be representative of an amount of time necessary to depressurize the fuel tank prior the fuel tank pressure decreasing below the first pressure threshold. The depressurization rate threshold may thus be based on a maximum duration for depressurizing the fuel tank below the first pressure threshold. If the depressurization rate is above the depressurization rate threshold, method 400 may proceed to 435. At 435, method 400 includes allowing the fuel tank pressure to decrease below the first threshold. This may include maintaining the FTIV open and may further include maintaining the COV in the $2^{nd}$ position.

If the depressurization rate is not above the depressurization rate threshold, method 400 may proceed to 440. At 440, method 400 includes pulsing the COV to the $1^{st}$ position until the fuel tank pressure decreases below the $1^{st}$ threshold. In this way, the rate of depressurization may be increased, decreasing the amount of time necessary to depressurize the fuel tank prior the fuel tank pressure decreasing below the first pressure threshold, while preventing exceedingly rapid depressurization. Pulsing the COV to the $1^{st}$ position may include moving the COV between the $1^{st}$ and $2^{nd}$ positions for predetermined durations. While the COV is in the $1^{st}$ position, the fuel vapor canister is fluidly coupled to atmosphere, bypassing the deactivated pump.

When the fuel tank pressure has decreased below the first threshold, method 400 may proceed to 445. At 445, method 400 may include placing the COV in the $1^{st}$ position, while maintaining the FTIV open, and further while maintaining the ELCM pump off. In this way, the rate of fuel tank depressurization may be increased, but only when the rate of depressurization will not interfere with the function of other components of the fuel system and/or evaporative emissions system.

Continuing at 450, method 400 includes allowing the fuel tank pressure to decrease below a second threshold. The second threshold may represent a lower fuel tank pressure than the first threshold. In some embodiments, at 450, method 400 may include allowing the fuel tank pressure to decrease to atmospheric pressure. When the fuel tank pressure has decreased below the second threshold, method 400 may proceed to 455. At 455, method 400 may allowing access to a fuel filler neck. For example, access to the fuel filler neck may be granted by unlocking a refueling door and/or refueling cap, and may be accompanied by a visual or aural signal to the refueling operator that refueling may proceed. In this way, refueling may be accomplished only when the fuel tank pressure has decreased below the second threshold. Method 400 may then end.

FIG. 5 depicts an example timeline 500 for venting a fuel tank upon a refueling request using the method described herein and with regards to FIG. 4 as applied to the systems described herein and with regards to FIGS. 1, 2, and 3A-3D. Timeline 500 includes plot 510, indicating whether a tank refueling request has been received over time. Timeline 500 also includes plot 520, indicating the status of an FTIV over time; plot 530, indicating the position of an ELCM changeover valve (COV) over time; plot 540, indicating the pressure inside a fuel tank over time; and plot 550, indicating the status of a fuel cap over time. Line 543 represents a first threshold for fuel tank pressure. Line 545 represents a second threshold for fuel tank pressure.

At time $t_0$, no tank refuel request in indicated, as shown by plot 510. As such, the FTIV is maintained closed, as shown by plot 520, and the COV is maintained in the $1^{st}$ position, as shown by plot 530. Additionally, the fuel cap is locked and maintained locked, as shown by plot 550.

At time $t_1$, a refueling request is received, as shown by plot 510. As shown by plot 540, the fuel tank pressure at time $t_1$ is greater than first threshold represented by line 543. Thus, the FTIV is opened, as shown by plot 520. The COV is placed in the $1^{st}$ conformation, as shown by plot 530. Additionally, the fuel cap is maintained in a locked conformation, as shown by plot 550.

From time $t_1$ to time $t_2$, fuel vapors to vent from the fuel tank to the evaporative emissions system, and gasses stripped of fuel vapor are vented to atmosphere via the ELCM pump vanes. As such, the fuel tank pressure decreases, as indicated by plot 540. The rate of fuel tank depressurization is adequate to depressurize the fuel tank in a reasonable amount of time. As such, there is no need to pulse the COV to the $1^{st}$ position.

At time $t_2$, fuel tank pressure drops below first threshold represented by line 543. In response to fuel tank pressure dropping below the first threshold, the COV is placed in the $2^{nd}$ position at time $t_2$, thereby increasing the flow rate of air out of the vent line.

This conformation is maintained from time $t_2$ to time $t_3$, allowing for fuel vapors to vent from the fuel tank to the evaporative emissions system. As such, the fuel tank pressure decreases, as indicated by plot 540. At time $t_3$, fuel tank pressure drops below the second threshold represented by line 545. In response to fuel tank pressure dropping below the second threshold, the fuel cap is unlocked, allowing refueling to proceed. The FTIV is maintained open, and the COV is maintained in the $1^{st}$ position, allowing for refueling vapors to be directed to the fuel vapor canister, and further allowing for gasses stripped of fuel vapor to be directed to atmosphere.

The systems described herein and depicted in FIGS. 1, 2, and 3A-3D, along with the method described herein and with regard to FIG. 4 may enable one or more systems and one or more methods. In one example, a method for a fuel system, comprising: during a first condition, fluidly coupling a fuel tank to a fuel vapor canister; and fluidly coupling the fuel vapor canister to atmosphere via a deactivated vacuum pump. The first condition may comprise a refueling request. The first condition may further comprise a fuel tank pressure above a first threshold. The method may further comprise: responsive to the fuel tank pressure decreasing below the first threshold, fluidly coupling the fuel vapor canister to atmosphere bypassing the deactivated vacuum pump. Fluidly coupling the fuel tank to the fuel vapor canister may comprise opening a fuel tank isolation valve. The deactivated vacuum pump may be coupled within an evaporative leak check module comprising a changeover valve operable between a first conformation and a second conformation. Fluidly coupling the fuel vapor canister to atmosphere via the deactivated vacuum pump may comprise placing the changeover valve in the second conformation. Fluidly coupling the fuel vapor canister to atmosphere bypassing the deactivated vacuum pump may comprise placing the changeover valve in the first conformation. The method may further comprise: responsive to a fuel tank depressurization rate being less than a depressurization threshold, pulsing the changeover valve between the first conformation and the second conformation. The method may further comprise: responsive to the fuel tank pressure decreasing below the first threshold, placing the changeover valve in the first conformation. The method may further comprise: responsive to the fuel tank pressure decreasing below a second threshold, the second threshold less than the first threshold, removing access restrictions to a fuel filler neck. The technical result of implementing this method is a reduction in the cost and complexity of the fuel system. By fluidly coupling the fuel vapor canister to atmosphere via a deactivated vacuum pump, the fuel tank may be depressurized slowly without requiring a multi-stage or multi-valve fuel tank isolation system, thus simplifying fuel system diagnostics.

In another example, a system for a hybrid-electric vehicle, comprising: a fuel tank isolation valve coupled in a conduit between a fuel tank and a fuel vapor canister; an evaporative leak check module coupled in a conduit between the fuel vapor canister and atmosphere, the evaporative leak check module comprising a vacuum pump and a changeover valve operable between a first and second conformation, the evaporative leak check module; and a controller configured with instructions stored in non-transitory memory that when executed cause the controller to: responsive to a refueling request and further responsive to a fuel tank pressure being greater than a first threshold: place the changeover valve in the second conformation without activating the vacuum pump; and open the fuel tank isolation valve. The changeover valve may be configured to couple the fuel vapor canister to atmosphere when in the first conformation, and where the changeover valve is further configured to couple the fuel vapor canister to atmosphere via the vacuum pump when in the second conformation. The controller may be configured with instructions stored in non-transitory memory that when executed cause the controller to: responsive to a fuel tank depressurization rate being less than a depressurization threshold, pulse the changeover valve between the first and second conformation while maintaining the fuel tank isolation valve open. The controller may be configured with instructions stored in non-transitory memory that when executed cause the controller to: place the changeover valve in the first conformation responsive to a fuel tank pressure being less than the first threshold. The method may further comprise a refueling lock coupled to the fuel tank via a fuel filler neck. The controller may be further configured with instructions to: maintain the changeover valve in the first conformation until the fuel tank pressure decreases below a second threshold, the second threshold lower than the first threshold; and then unlock the refueling lock. The technical result of implementing this system is a reduction in the risk of aspirating the fuel limit vent valve shut by opening the fuel tank isolation valve during depressurization. In this way, the rate of successful refueling events may increase.

In yet another example, a method for refueling a vehicle, comprising: responsive to a refueling request, and during a condition where a fuel tank pressure is greater than a first threshold, opening a fuel tank isolation valve coupled between a fuel tank and a fuel vapor canister; fluidly coupling the fuel vapor canister to atmosphere via a deactivated vacuum pump; and responsive to the fuel tank pressure decreasing below the first threshold, fluidly coupling the fuel vapor canister to atmosphere bypassing the deactivated vacuum pump. Fluidly coupling the fuel vapor canister to atmosphere bypassing the deactivated vacuum pump may comprise placing an evaporative leak check module changeover valve in the first conformation, and fluidly coupling the fuel vapor canister to atmosphere via the deactivated vacuum pump may comprise placing the evaporative leak check module changeover valve in the second conformation. The method may further comprise: responsive to a fuel tank depressurization rate being less than a depressurization threshold, pulsing the evaporative leak check module changeover valve between the first conformation and the second conformation. The technical result of implementing this method is a two-stage fuel tank depressurization that does not require a two-stage fuel tank isolation valve or a multi-valve fuel tank isolation system. In this way, fuel system diagnostics may be simplified, leading to more robust diagnostic tests.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
responsive to a refueling request and prior to allowing access to a fuel filler neck, fluidly coupling a fuel tank to a fuel vapor canister by opening a valve;
fluidly coupling the fuel vapor canister to atmosphere via a deactivated vacuum pump, where the fuel vapor canister is fluidly coupled to atmosphere via the deactivated vacuum pump further responsive to a fuel tank pressure above a first threshold;

responsive to the fuel tank pressure decreasing below the first threshold, fluidly coupling the fuel vapor canister to atmosphere bypassing the deactivated vacuum pump, where the deactivated vacuum pump is coupled within an evaporative leak check module comprising a changeover valve operable between a first conformation and a second conformation, where fluidly coupling the fuel vapor canister to atmosphere via the deactivated vacuum pump comprises placing the changeover valve in the second conformation, and where fluidly coupling the fuel vapor canister to atmosphere bypassing the deactivated vacuum pump comprises placing the changeover valve in the first conformation; and responsive to a fuel tank depressurization rate being less than a depressurization threshold, pulsing the changeover valve between the first conformation and the second conformation.

2. The method of claim 1, further comprising if a depressurization rate of the fuel tank is less than a threshold when the fuel vapor canister is coupled to atmosphere via the deactivated vacuum pump, pulsing the changeover valve, where the fuel vapor canister is fluidly coupled to atmosphere bypassing the deactivated vacuum pump each time the changeover valve is pulsed.

3. The method of claim 1, where the valve that is opened to fluidly couple the fuel tank to the fuel vapor canister is a fuel tank isolation valve.

4. The method of claim 1, further comprising:
responsive to the fuel tank pressure decreasing below the first threshold, placing the changeover valve in the first conformation.

5. The method of claim 4, further comprising:
responsive to the fuel tank pressure decreasing below a second threshold, the second threshold less than the first threshold, removing access restrictions to the fuel filler neck.

6. A method for refueling a vehicle, comprising:
responsive to a refueling request and prior to allowing access to a fuel filler neck, and during a condition where a fuel tank pressure is greater than a first threshold, opening a fuel tank isolation valve coupled between a fuel tank and a fuel vapor canister;

fluidly coupling the fuel vapor canister to atmosphere via a deactivated vacuum pump;

responsive to the fuel tank pressure decreasing below the first threshold, fluidly coupling the fuel vapor canister to atmosphere bypassing the deactivated vacuum pump, where fluidly coupling the fuel vapor canister to atmosphere bypassing the deactivated vacuum pump comprises placing an evaporative leak check module changeover valve in a first conformation, and where fluidly coupling the fuel vapor canister to atmosphere via the deactivated vacuum pump comprises placing the evaporative leak check module changeover valve in a second conformation; and responsive to a fuel tank depressurization rate being less than a depressurization threshold, pulsing the evaporative leak check module changeover valve between the first conformation and the second conformation.

7. A method for a fuel system, comprising:
during a first condition, fluidly coupling a fuel tank to a fuel vapor canister;

fluidly coupling the fuel vapor canister to atmosphere via a deactivated vacuum pump, where the first condition comprises a refueling request and a fuel tank pressure above a first threshold;

responsive to the fuel tank pressure decreasing below the first threshold, fluidly coupling the fuel vapor canister to atmosphere bypassing the deactivated vacuum pump, where the deactivated vacuum pump is coupled within an evaporative leak check module comprising a changeover valve operable between a first conformation and a second conformation and where fluidly coupling the fuel vapor canister to atmosphere via the deactivated vacuum pump comprises placing the changeover valve in the second conformation where fluidly coupling the fuel vapor canister to atmosphere bypassing the deactivated vacuum pump comprises placing the changeover valve in the first conformation; and responsive to a fuel tank depressurization rate being less than a depressurization threshold, pulsing the changeover valve between the first conformation and the second conformation.

8. The method of claim 7, where fluidly coupling the fuel tank to the fuel vapor canister comprises opening a fuel tank isolation valve.

* * * * *